June 30, 1959 N. B. WILSON 2,892,525
CENTRIFUGAL CLUTCH
Filed June 3, 1957 2 Sheets-Sheet 1
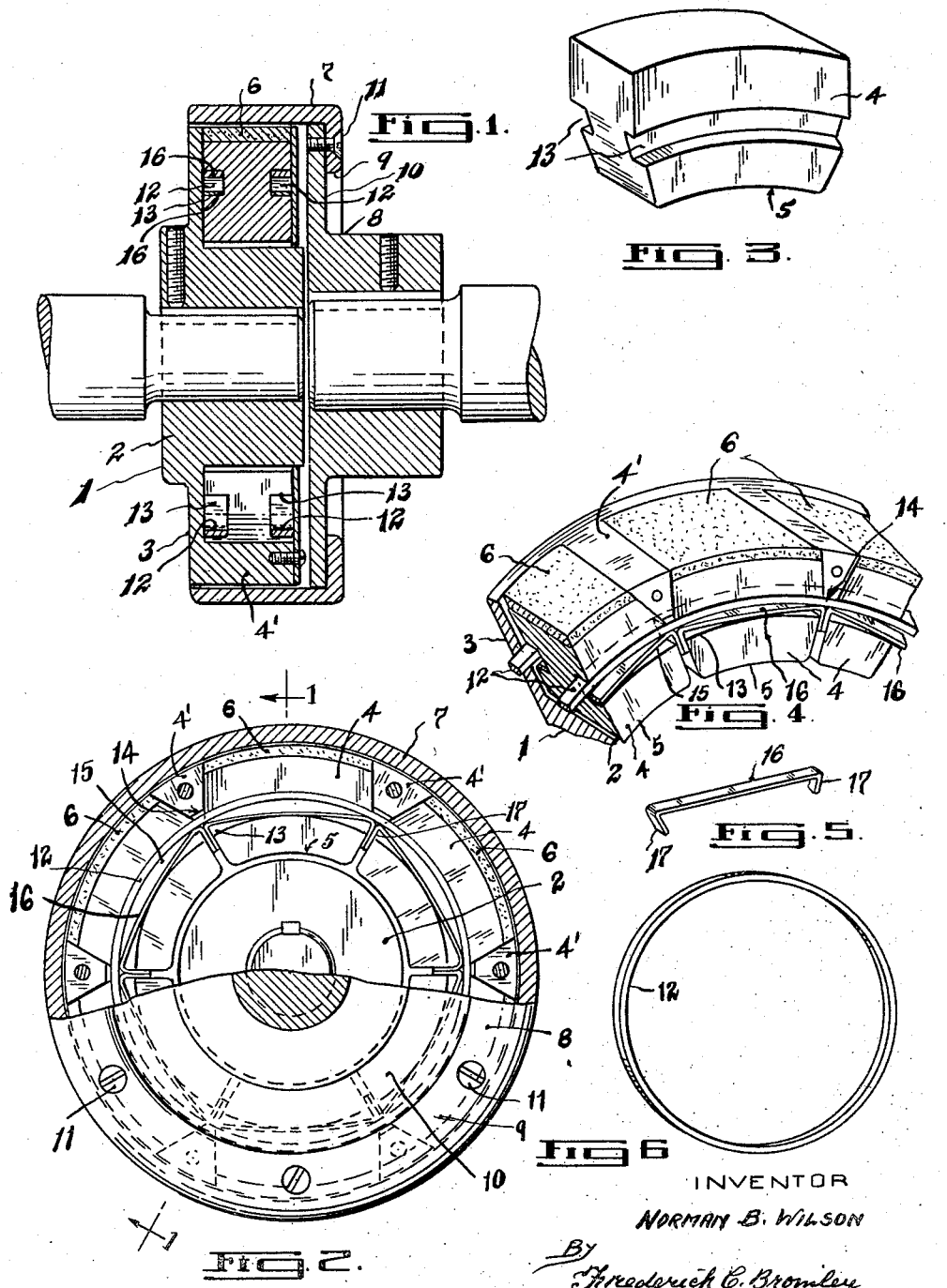
INVENTOR
NORMAN B. WILSON
BY
Frederick C. Bromley
ATTY June 30, 1959  N. B. WILSON  2,892,525
CENTRIFUGAL CLUTCH
Filed June 3, 1957  2 Sheets-Sheet 2

INVENTOR
NORMAN B. WILSON
BY Frederick E. Bromley
ATTORNEY

United States Patent Office 2,892,525
Patented June 30, 1959

2,892,525

CENTRIFUGAL CLUTCH

Norman B. Wilson, Toronto, Ontario, Canada

Application June 3, 1957, Serial No. 663,278

5 Claims. (Cl. 192—105)

My invention relates to improvements in clutches of the centrifugal type employing a circular series of shoes arranged to move outwardly under centrifugal force to bring about a driving connection between a driving member and a driven member providing a drum.

In prior art clutches of this kind it is usual to provide means for causing the shoes to rotate in unison with the driving member without hampering their radial movement and to limit the outward movement of the shoes in a positive manner so that when the linings are worn excessively the metal shoes may not come into contact with the drum and score the same.

The present invention particularly concerns a clutch of the kind referred to in which the driving member carries dogs which are interposed between adjacent end faces of the shoes to establish a positive driving connection and in which the shoes are yieldably constrained against outward movement until the clutch has attained a predetermined speed.

According to prior art structures the shoes may be fitted with interfitting pins or lugs to cause them to move in unison and such pins, lugs, or the like may have abutting engagement with the dogs to limit outward movement of the shoes. Further, coil springs mounted on radial pins carried by a spider may serve to yieldably constrain the shoes against outward movement until the driving member has attained a given speed.

It is an important object of the present invention to provide an improved clutch structure of this nature and to furnish a highly reliable and efficient clutch incorporating a structure which is simple in operation and highly serviceable.

A further object is to provide a construction in which an inelastic ring is lodged in grooves provided in the shoes to limit their outward movement and in which the ring is held concentric to the axis of the clutch, such as by engagement with the driving dogs.

Still another object is to provide a construction of this kind in which the ring is of a less thickness than the depth of the grooves in the shoes whereby free spaces are provided in the grooves at the inner side of the ring to accommodate resilient means, preferably in the form of leaf springs, which co-act with the ring to press the shoes into contracted positions.

A still further object is to provide an assembly of arcuate shoes for a centrifugal clutch in which the shoes are segments of a ring and are provided with curvilinear grooves or comparable passageways supplementary to on another and jointly forming a circular slot or channel for a solid ring which is dimensioned to allow the shoes to have limited radial movement. Accordingly the shoes are constrained as to their outward movements and therefore cannot come into contact with the drum even when the linings are worn excessively. Moreover, it is a feature of the assembly that the ring is used as a seating surface or like support for springs which are adapted to press the shoes inwardly to their retracted positions. Desirably leaf springs are employed and these are disposed coterminous with the individual shoes, and means are supplied to preclude unwanted end movement of the leaf springs.

These and other desirable subsidiary objects are attained by the construction shown in the accompanying drawings, in which:

Fig. 1 is a longitudinal section of the clutch showing the improvements;

Fig. 2 is a right-hand end view of the clutch showing the drum partly in section to disclose the interior structure;

Fig. 3 is a perspective view of one of the shoes;

Fig. 4 is a fragmentary assembly view showing several of the shoes on the driving member when the co-acting solid ring and the leaf springs lodged in the grooves of the shoes;

Fig. 5 is a perspective view of one of the leaf springs;

Fig. 6 is a view in perspective of a solid ring.

Figure 7:
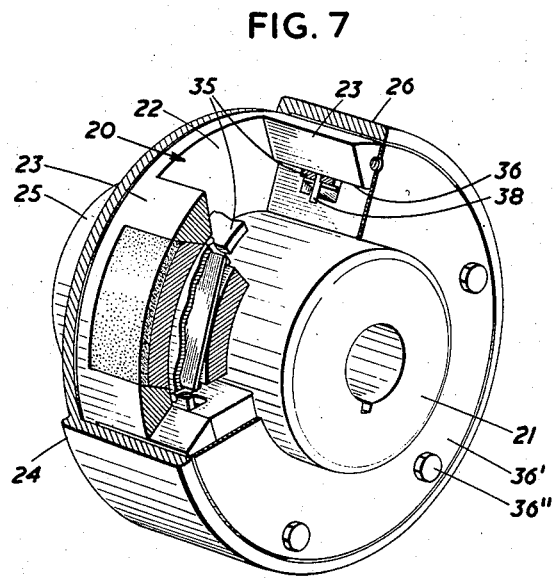
Figure 8:
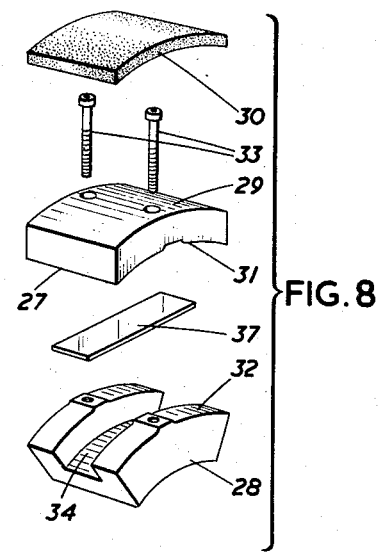
Figure 9:
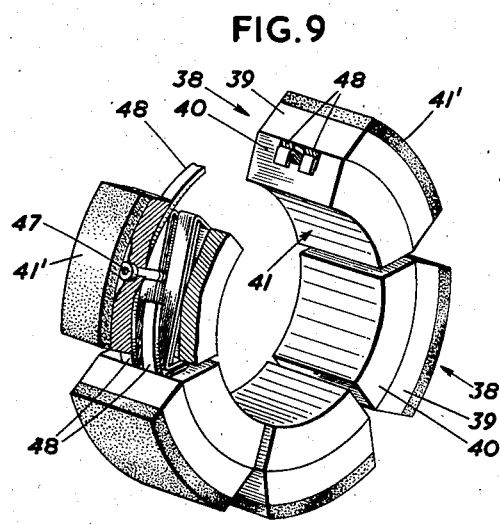
Figure 10:
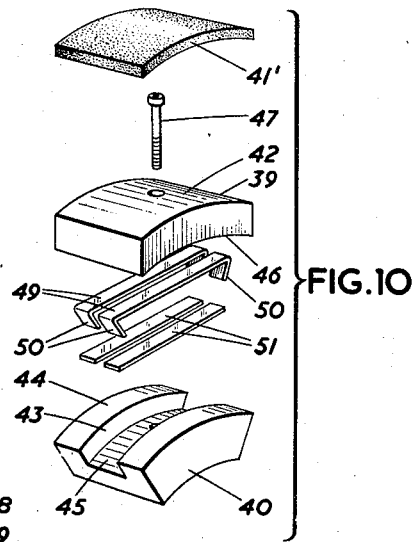

Figs. 7 to 10 inclusive illustrate a modification of the invention in which Fig. 7 is a perspective view of the clutch with parts broken away and showing an arrangement in which the shoes are each constructed of two parts fastened together and providing a channel of an arcuate shape through which the solid ring extends, and in which the leaf spring is disposed;

Fig. 8 is an exploded view of the shoe structure depicted if Fig. 7, including the loose lining;

Fig. 9 is a perspective view of a circular series of shoes each formed in two parts and provided with a channel or groove through which a pair of solid rings extend and in which is seated an arrangement of leaf springs; and Fig. 10 is an exploded view showing one of the shoes belonging to Fig. 9 and the loose lining.

In the drawing there is shown a centrifugal clutch embodying a driving member, generally indicated at 1, and having a hub portion 2 which may be for example keyed or otherwise secured on a shaft connected with a source of power. The driving member has a radial flange or disc portion, indicated at 3, which carries a circular series of dogs 4' integral therewith or secured thereto as is well-known in the art. The dogs extend inwardly to serve as driving agents for the shoes, denoted at 4. These shoes are shown as arcuate members and form a circular series about the axis of rotation and are made of a suitable metal. The end faces of a shoe are parallel to a radial line bisecting the shoe and the shoes slide freely radially between the dogs. The inner face 5 of each shoe is desirably arcuate to conform to the external diameter of the boss 2 and the shoes abut the boss in contracted position. The shoes are individually lined, preferably by loose linings, indicated at 6, which linings extend between adjacent dogs and serve to frictionally engage the drum 7 of the driven member 8 when urged outwardly by the shoes under centrifugal force.

Desirably the drum 7 is detachable and to this end it is shown as provided with a flange 9, by which it is secured to the wall 10, as by screw fasteners 11 to provide the detachable connection. Any type of fastening elements may be employed and the advantage of the detachable drum is that it may be disconnected from the radial wall 10 and pulled away from the driving member clear of the shoes to permit one or more of the linings to be replaced as occasion may require in the servicing of the clutch.

The improvements of the present invention comprise the inelastic ring 12, which is desirably an endless member of a generally rectangular shape in cross section. Two such rings are supplied, and the shoes are provided with circular grooves 13 at both their sides. The circularity of said grooves conforms substantially to that of the rings. Accordingly, the grooves at each side of the shoes, jointly constitute a generally circular channel, since one groove forms a continuation of another to provide the circular series required to accommodate the ring. The ring is held to a concentric position with respect to the axis of the clutch by any suitable means, preferably, however, by abutment with the inner ends 4' of the dogs.

The ring is of a less thickness than the depth of the grooves so that there is provided a free space in each groove at the inner side of the ring. When the shoes are in their contracted positions the free space, indicated at 15, serves to accommodate a leaf spring 16. Accordingly, there is a leaf spring disposed in the groove of each shoe inwardly of ring 12. The intermediate portion of each leaf spring is tensioned against the adjacent inner side wall of the respective groove and the ends of the spring are arranged to bear against the ring 12. Consequently, the leaf springs exert individual constraining forces on the shoes in the operation of the clutch and the constraining efforts of the springs retard the outward movement of the shoes until the driving member reaches a predetermined speed, whereupon the magnitude of the centrifugal force overcomes the conjoint efforts of the springs causing the shoes to move outwardly to bring their linings in contact with the drum to establish the frictional drive.

It will be evident from what has been said that the leaf springs co-act with the ring, not only to yieldably restrain the shoes against outward movement, but also to bring about such outward movement in a uniform manner. The shoes are positively limited in their outward movement by flexure of the leaf springs to such an extent that their intermediate portions are brought into abutment with the ring. The arrangement is such that the metal shoes cannot come into contact with the friction face of the drum in the event that the linings wear excessively. Each leaf spring is held against displacement in its respective groove by suitable means. One way of accomplishing this is to bend the ends of the springs inwardly over the end faces of the respective shoes, as indicated at 17. This provides a very satisfactory arrangement. However, it is not intended that the invention shall be restricted in this respect as other means may be resorted to for this purpose. Obviously, springs may be used in a clutch having a desired strength according to the magnitude of the resisting force desired to be applied.

A clutch of this structure is easy to assemble and will be found to be highly serviceable in operation.

In the drawing it will be noted that there is shown a set of channel-forming grooves at each side of the shoes and supplied with a ring and set of leaf springs. This arrangement provides a symmetrical shoe assembly which is preferable in actual practice. The solid ring and the leaf spring in the arrangement herein disclosed provide a combination of parts which supplant the prior art structures herein before referred to and it has been found in actual practice that the invention is more satisfactory and reliable than the prior art structures.

In the modification depicted in Figures 7 to 10 inclusive, and with particular reference to Figures 7 and 8 there is shown a clutch structure comprising a driving member generally indicated at 20 which has the hub 21 integral with the radial disc 22 that carries the dogs 23 which dogs in cross section are wedge shaped. The driving member 24 has a hub element 25 and a drum element 26. The general shape of the shoes is the same as that previously described. The novel feature, however, is that the shoes are each formed in two parts, there being an outer arcuate member 27 and an inner supplementary part 28 which although shown as of a general arcuate shape could be of some other configuration if so desired.

The outer member 27 of the shoes is curved through its length, and its outer face 29 seats the loose lining 30 which is disposed between adjacent dogs 23. The concaved inner face 31 of the outer member 27 mates with the outer face 32 of the inner element 28, and the members 27 and 28 are secured together by screws 33 having their heads lodged in counterbores belonging to the screw holes in the outer member. The screws have threaded engagement with the inner member 28.

A groove 34 is provided preferably in the inner member 28 of the shoe to extend lengthwise thereof. This groove is curved through its length to conform to the arcuate shape of the member 28 and is open to the top face 32 thereof. In the assembled condition of the members 27 and 28 the face 31 of the former encloses the groove which is open at the ends of the shoe. Accordingly the grooves of the shoe provide a continuous opening for the endless solid ring 35.

The ring 35 is of a cross section which is desirably that of an irregular rectangle and the ring fits loosely in the grooves 35 which grooves jointly form a generally circular channel throughout the series of shoes.

Ring 35 is of a diameter such that its outer face makes contact with the inner edge faces 36 of the dogs and therefore is held to a concentric disposition. The inelastic ring 35 is freely lodged in the grooves 34 and is of a less thickness than the depth of the grooves whereby to provide for limited outward movement of the shoes.

Spring devices are supplied for restraining the shoes against outward radial movement. The spring devices are shown as flat springs 37 in Figures 7 and 8 and these leaf springs are substantially co-terminus with the grooves in the shoes. Springs 37 are disposed between the ring 35 and the bottom of the respective grooves 34 and function similarly to the springs 16 previously described. Means are provided to preclude undesired endwise movement of the leaf springs 37 with respect to the shoes. One way of accomplishing this is to provide pins 38 at intervals along the ring 35 to project inwardly radially thereof between adjacent shoes so as to provide positive stop means for the ends of the leaf springs.

From the construction just described it will be manifest that the leaf springs bear against the rings at their end parts and the medial parts bear against the respective bottom walls of the grooves. Since each shoe is made in two parts it can be dis-assembled quite readily and moreover the outer part 29 can be made of a different metal to the inner part 28 in order to vary the weight mass of the shoe. Moreover, the size of the inner member 28 may be reduced in order to provide a shoe of a less weight mass. These and other advantages stem from the two part construction of the shoe. With reference to Figure 7, it will be observed that the shoe assembly is retained in place on the driving member by means of an end plate 36' which is attached to the dogs by means of screws 36". The retaining means is well known in the art and does not form a part of the instant invention.

The shoe assembly depicted in Figures 9 and 10 is similar to that of Figures 7 and 8 with the exception of minor features of construction, one of which comprises the means for retaining the leaf springs against endwise movement and another of which is the employment of dual solid rings each serving to seat leaf springs belonging to the individual shoes and separated by fastening elements.

Each shoe is denoted as a whole by the reference numeral 38, and comprises the outer arcuate member 39 and the inner arcuate member 40. The loose lining is denoted at 41'. Each shoe has a concaved inner face which is supplied on the inner member 40 as denoted at 41. The concaved face 41 substantially conforms to the diameter of the hub 21 of the driving member. The peripheral face 42 of the outer member 39 serves to press the lining into engagement with the drum as will be well understood in the art.

Each shoe has a curvilinear groove 43 similar to the groove 34 of the shoes depicted in Figures 7 and 8. The groove 43 extends endwise of the respective shoe medially of its width and is fashioned to extend inwardly of the face 44 to provide a bottom wall 45. The face 44 is an inner face that mates with the inner face 46 of the outer member 39, the latter face serves to enclose the groove to provide an opening there through or channel and it will be observed that the groove in one shoe is a circular continuation of a groove in another shoe whereby the grooves in the complement of shoes provide a generally circular channel. The outer and inner parts 39 and 40 of a shoe are detachably secured together by a screw as indicated at 47 which has its head countersunk in the outer member 39 and is threadedly engaged with the inner member. The screw is located medially of the width of the groove 43.

Two solid rings indicated at 48 are provided for the shoe assembly, these rings are loosely disposed in the groove 43 and are placed one on each side of the screws 47 so as to straddle the same. A leaf spring indicated at 49 is positioned at the inner side of each of the rings 48 to extend through the respective grooves 43 and to terminate at the ends of the inner member 40 of the respective shoe, the leaf spring 49 of each shoe seats on the bottom wall 45 of the respective shoe. The ends of the leaf springs of each shoe are bent downwardly in juxtaposition to the end faces of the inner member 40 are at 50 and thus preclude endwise displacement of the leaf springs. Ancillary leaf springs 51 may be employed if so desired in order to increase the resistance to outward movement of the shoes under centrifugal action.

The shoe assembly just described is not only compact but also highly efficient and moreover provides a very durable shoe assembly. The rings 48 are inelastic members and are made of a less thickness than the depth of the grooves 43 to delimit outward movement of the shoes. An advantageous feature of the split shoes is that one part may be made of a metal having a different specific gravity to the other, whereby the weight of a shoe may be changed or varied according to requirements in the manufacture of the clutch. There are other advantages, one of which is the quiet running of the clutch and the ease of assembly of the components.

While the invention has been described in a selected embodiment, it will be understood by those skilled in the art that such changes and modifications may be resorted to as fairly come within the scope of the appended claims.

What I claim is:

1. A centrifugal clutch comprising a driving member, a driven member having a drum, a complement of centrifugal shoes arranged in a circular series about the axis of said driven member and each having a peripheral friction face engageable with said drum, driving dogs interposed between adjacent shoes outwardly thereof and rigid with said driving member, said dogs having terminal inner end faces, said shoes having arcuate grooves formed therein, said grooves being continuations of one another and jointly constituting a generally circular channel, and an inelastic ring lodged in said grooves and being of a less thickness than the depth of said grooves to provide a free space at the inner side of each groove, said ring being of an external diameter such as to abut said inner end faces of said dogs.

2. A centrifugal clutch comprising a driving member, a driven member having a drum, a complement of centrifugal shoes arranged in a circular series about the axis of said driven member and each having a peripheral friction face engageable with said drum, driving dogs interposed between adjacent shoes outwardly thereof and rigid with said driving member, said dogs having terminal inner end faces, said shoes having arcuate grooves formed therein, said grooves being continuations of one another and jointly constituting a generally circular channel, an inelastic ring lodged in said grooves and of a less thickness than the depth of said grooves to provide a free space at the inner side of each groove, said ring having an external diameter dimensioned to abut said inner end faces of said dogs, and spring means lodged within the said free space at the inner sides of said grooves and having seating engagement with said ring to press the shoes inwardly, said spring means including flat spring devices disposed longitudinally of said grooves and also having seating engagement with said shoes at points removed from said seating engagement with said ring.

3. A centrifugal clutch comprising a driving member, a driven member having a drum, a complement of centrifugal shoes arranged in a circular series about the axis of said driven member and each having a peripheral friction face engageable with said drum, driving dogs interposed between adjacent shoes outwardly thereof and rigid with said driving member, said dogs having terminal inner end faces, said shoes having arcuate grooves formed therein, said grooves being continuations of one another and jointly constituting a generally circular channel, an inelastic ring lodged in said grooves and of a less thickness than the depth of said grooves to provide a free space at the inner side of each groove, said ring having an external diameter dimensioned to abut said inner end faces of said dogs, and a flat spring longitudinally lodged within said free space at the inner side of each groove and having its ends bent down over the ends of the respective shoe and having seating engagement with the shoe and with said ring at spaced points to press the shoe inwardly.

4. A centrifugal clutch comprising a driving member, a driven member having a drum, a complement of centrifugal shoes arranged in a circular series about the axis of said driven member and each having a peripheral friction face engageable with said drum, driving dogs interposed between adjacent shoes outwardly thereof and rigid with said driving member, said dogs having terminal inner end faces, said shoes having arcuate grooves formed therein, said grooves being continuations of one another and jointly constituting a generally circular channel, an inelastic ring lodged in said grooves and of a less thickness than the depth of said grooves to provide a free space at the inner side of each groove, said ring having an external diameter dimensioned to abut said inner end faces of said dogs, a flat spring longitudinally lodged within said free space at the inner side of each groove and having seating engagement with said ring and with the respective shoe at spaced points to press the shoe inwardly, and abutment means limiting endwise movement of said spring.

5. A structure as set forth in claim 4, in which each shoe is formed of two parts having mating faces and secured together by fastening elements, and in which the groove of a shoe is formed in one or the other of said mating faces and enclosed thereby.

References Cited in the file of this patent

UNITED STATES PATENTS

| | | |
|---|---|---|
| 1,197,895 | Bendl | Sept. 12, 1916 |
| 2,381,196 | Wilson | Aug. 7, 1945 |
| 2,529,610 | Jensen et al. | Nov. 14, 1950 |

FOREIGN PATENTS

| | | |
|---|---|---|
| 445,003 | Great Britain | Apr. 1, 1936 |